United States Patent [19]

Harrison

[11] Patent Number: 4,892,173
[45] Date of Patent: Jan. 9, 1990

[54] DISC BRAKES IN VEHICLES

[75] Inventor: Anthony W. Harrison, Birmingham, England

[73] Assignee: Lucas Industries Public Limited Co., Birmingham, United Kingdom

[21] Appl. No.: 268,663

[22] Filed: Nov. 4, 1988

Related U.S. Application Data

[63] Continuation of Ser. No. 27,785, Mar. 19, 1987, abandoned.

[30] Foreign Application Priority Data

Mar. 27, 1986 [GB] United Kingdom ................. 8607760

[51] Int. Cl.4 ..................... F16D 55/224; F16D 65/20
[52] U.S. Cl. .............................. 188/73.44; 188/73.32; 188/73.45; 188/370
[58] Field of Search ................... 188/73.44, 72.4, 72.6, 188/73.32, 73.45, 170, 370

[56] References Cited

U.S. PATENT DOCUMENTS

| | | | |
|---|---|---|---|
| 3,442,353 | 5/1969 | Harrison | 188/73.45 |
| 3,915,263 | 10/1975 | Courbot | 188/72.4 |
| 4,155,431 | 5/1979 | Johnson | 188/170 |
| 4,331,221 | 5/1982 | Evan et al. | 188/73.44 |
| 4,391,355 | 7/1983 | Evans | 188/73.44 |
| 4,522,287 | 6/1985 | Heidmann et al. | 188/73.45 X |

FOREIGN PATENT DOCUMENTS

| | | | |
|---|---|---|---|
| 1018907 | 10/1977 | Canada | 188/73.32 |
| 2538565 | 3/1976 | Fed. Rep. of Germany | 188/73.44 |
| 0063561 | 5/1977 | Japan | 188/73.45 |

Primary Examiner—Andres Kashnikow
Assistant Examiner—Richard Potosnak
Attorney, Agent, or Firm—Harness, Dickey & Pierce

[57] ABSTRACT

A caliper is mounted on an axle casing of a rail vehicle by a first bracket and by a second bracket positioned between the disc and the first bracket. One of the brackets is detachably mounted on the casing and is removable to permit the caliper to be removed by movement in a generally axial direction. To permit this to happen the caliper and the other detachable bracket both lie outside the projected peripheral edge of a flange on the axle on which a wheel is mounted.

17 Claims, 4 Drawing Sheets

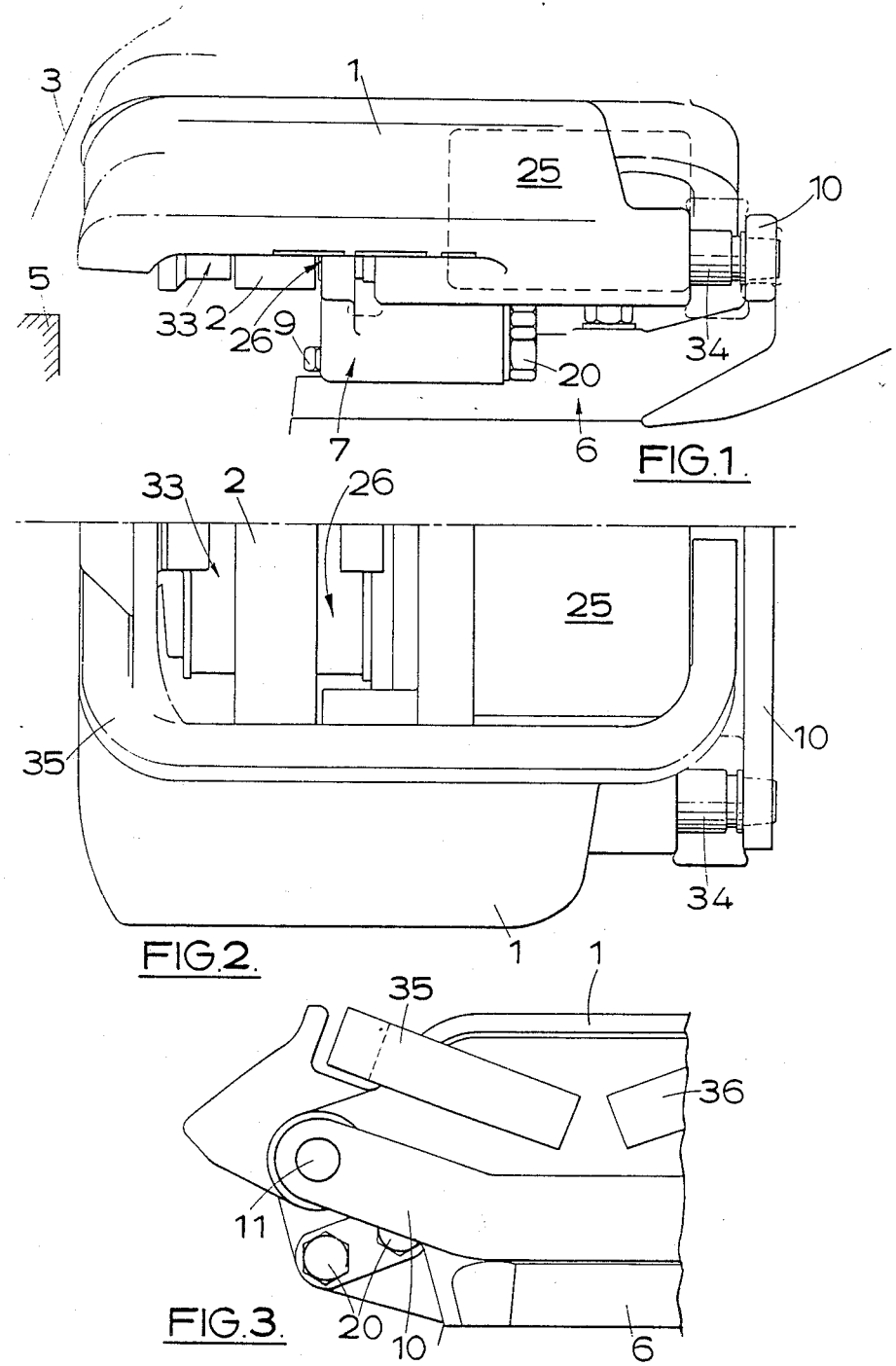

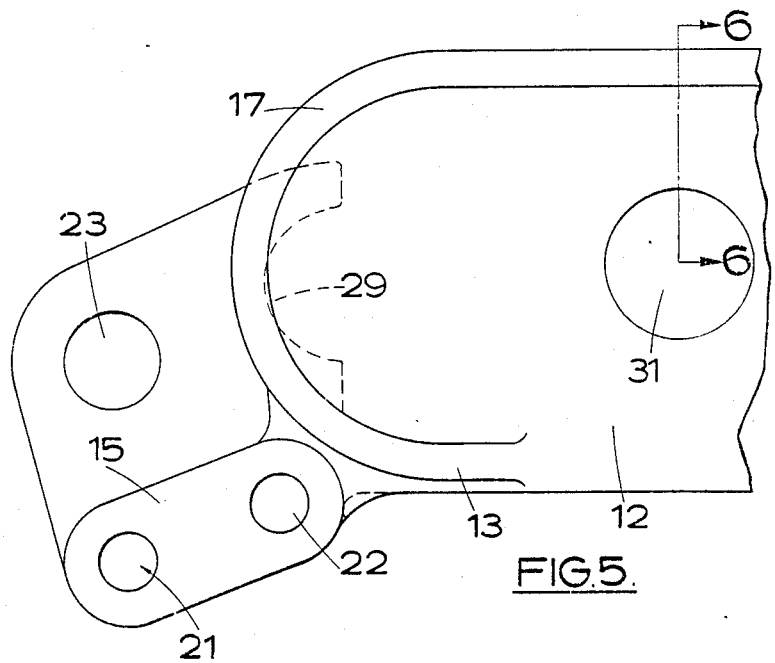
FIG.5.
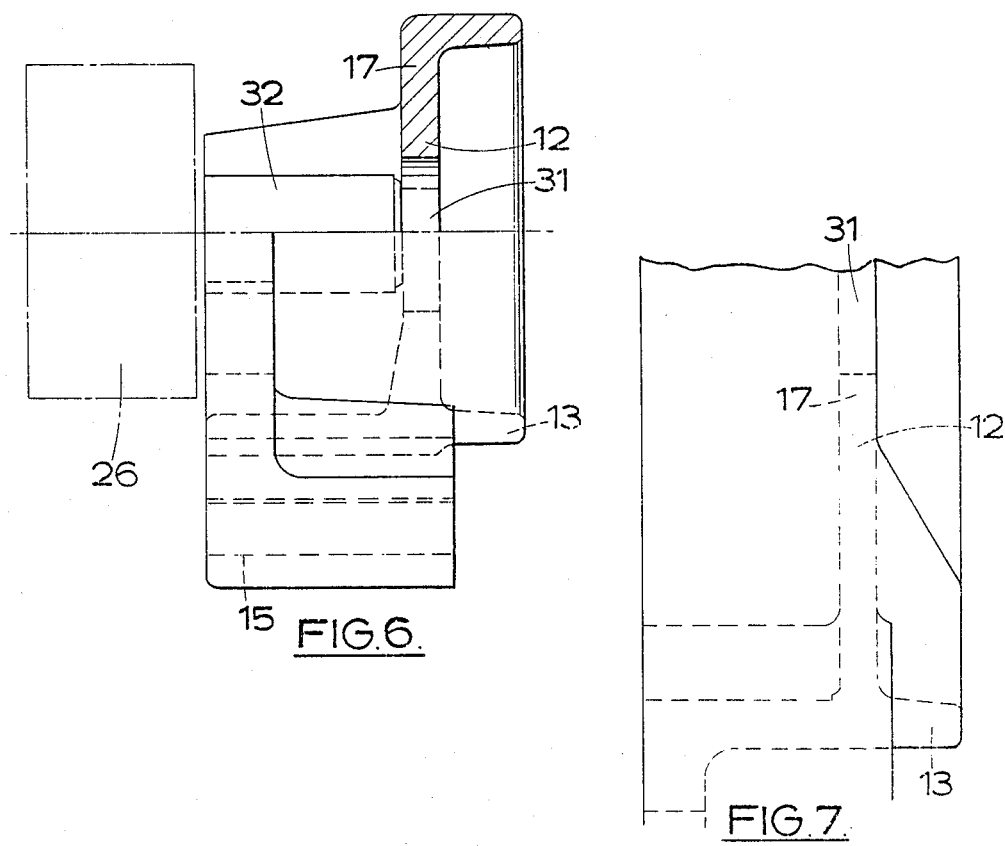
FIG.6.
FIG.7.

DISC BRAKES IN VEHICLES

This is a continuation of U.S. patent application Ser. No. 027,785, filed Mar. 19, 1987, abandoned.

This invention relates to disc brakes for vehicles.

In rail vehicles such as tramcars and vehicles of rapid transit systems installation space for disc brakes is always severely restricted and it is always difficult to remove caliper assemblies of such brakes for servicing. This may require the separation of an axle or bogie from the body of the vehicle.

Whereas most rail vehicles have pairs of wheels forced onto opposite ends of an axle in a semi-permanent manner, some employ 'bolted-on' wheels. In constructions incorporating 'bolted-on' wheels which are readily removable, due to space constraints, in a radial direction, it is desirable for the caliper assembly, and for the disc of the brake, to be removable in an axial direction. In such a case, since the axle flange on which the wheel is mounted is inconvenient to remove, no part of the caliper must project substantially inside the peripheral edge of the axle flange since shortage of radial space often also curtails the projection of the caliper assembly radially outwards from the axle. The small radial depth left for such a caliper assembly creates difficulties in attaining sufficient strength and stiffness in a fixed mounting bracket when using a conventional arrangement in which the bracket is located in a space between at least one friction pad assembly and the axle.

According to our invention we provide a disc brake for a vehicle having a caliper assembly incorporating means for applying friction pad assemblies to opposite faces of a disc rotatable with an axle-mounted wheel, wherein the caliper assembly is mounted on the axle on the inboard side of the disc by means of a bracket which is detachably mounted on the axle and incorporates a flange projecting radially outwards to mount the caliper assembly The bracket incorporates a diaphragm which extends between the caliper assembly and the adjacent inboard friction pad assembly, the diaphragm being provided with at least one opening through which a brake-applying force from the caliper assembly can be transmitted to the inboard pad assembly. The caliper assembly and the bracket lie substantially outside the peripheral edge of the flange on the axle on which the wheel is mounted so that after removing the wheel and detaching the bracket from the axle, the disc and the caliper assembly can be withdrawn from the axle in an axial direction.

Preferably a rod passes through the opening to transmit the force to the inboard pad assembly. Such an opening does not significantly affect the strength of the bracket.

The caliper assembly is therefore supported by the two flanges at axially spaced positions which provides adequate stability and through which the drag forces are transmitted to the axle casing when the brake is applied.

When the caliper assembly is of the axially movable reaction type, the inboard pad assembly is applied directly to the disc and the outboard pad assembly is applied indirectly to the disc by the reaction on the caliper assembly. In such a construction the caliper is supported for axial movement on at least one axially extending guide pin whose axis is parallel to that of the axle with the guide pin being supported at opposite ends. Preferably two such guide pins are provided to prevent the caliper from rotating. However, if only one pin is incorporated, the caliper assembly may be prevented from moving angularly around the guide pin as an axis by a suitably placed anti-articulation link which may or may not have to be detached for removal of the caliper assembly in an axial direction.

The friction pad assemblies may be arranged in a conventional manner with the outboard reaction pad assembly either carried by the caliper assembly directly or by means of a load-spread plate which provides a degree of articulation. The directly actuated inboard pad assembly is guided by surfaces either on the caliper assembly or on the bracket. The inboard pad assembly may also be supported by the same or by a different load spread-plate which may articulate.

The diaphragm on the bracket which extends between directly actuated friction pad assembly and the caliper assembly is preferably provided with relatively thin axially extending flanges which are disposed between the pad assembly and the axle, and extend circumferentially around the periphery of the actuator in the caliper assembly as far as installation space considerations will allow.

Preferably the bracket is also provided with strong fixing points for co-operation with the axle and the fixing points lie radially outside the peripheral edge of the axle flange.

Conveniently the fixing points incorporate radial mounting faces which are clamped into mating engagement with complementary faces by suitable clamp bolts.

The flange of the bracket may also be provided at circumferentially spaced opposite ends of the diaphragm with pad guide surfaces which project from the diaphragm towards the disc. Preferably such guide surfaces are part cylindrical to facilitate machining.

Preferably the bracket co-operates with a bracket which is fixed to the axle and extends axially and incorporates a radial flange for co-operation with the caliper assembly at its inner end.

The complete guide pin or pins remain associated with the first bracket during the fitting of the caliper assembly to the axle. The cleanliness, lubrication, and weather protection seals or bolts are not, therefore, affected by the relatively poor environmental conditions which may exist at that time. The guide pin or pins are preferably integral with the bracket. In such a construction the or each inboard end remote from the disc may conveniently be frusto-conical and be axially received in a fixed supporting boss defined in the flange and which is not removable with the caliper assembly. The conical surfaces are adapted to guide the pins easily into their correct positions during assembly and then become locked upon tightening bolts for fastening the removable bracket to the fixed bracket.

One embodiment of our invention is illustrated in the accompanying drawings in which:

FIG. 1 is a side elevation of a disc brake for a rail vehicle;

FIG. 2 is a plan view of substantially one-half of the brake of FIG. 1;

FIG. 3 is a view of the inboard end;

FIG. 5 is a view of the inboard end of substantially one half of a removable bracket;

FIG. 6 is a side view of the bracket including a part section on the line 6—6 of FIG. 5;

FIG. 7 is a underneath plan view of the bracket;

Figure 4:
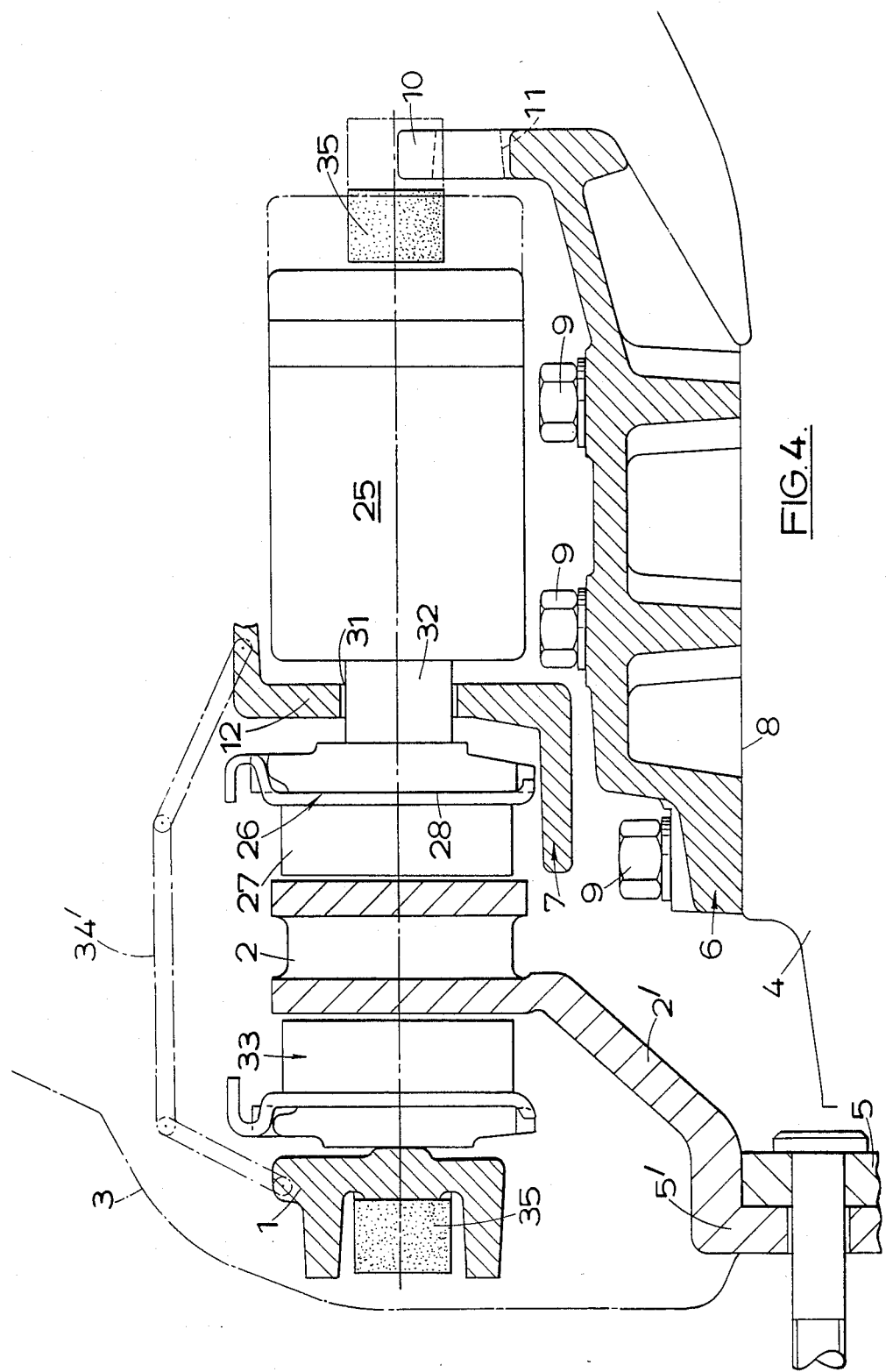
FIG. 4 is a longitudinal section through the brake.
Figure 8:
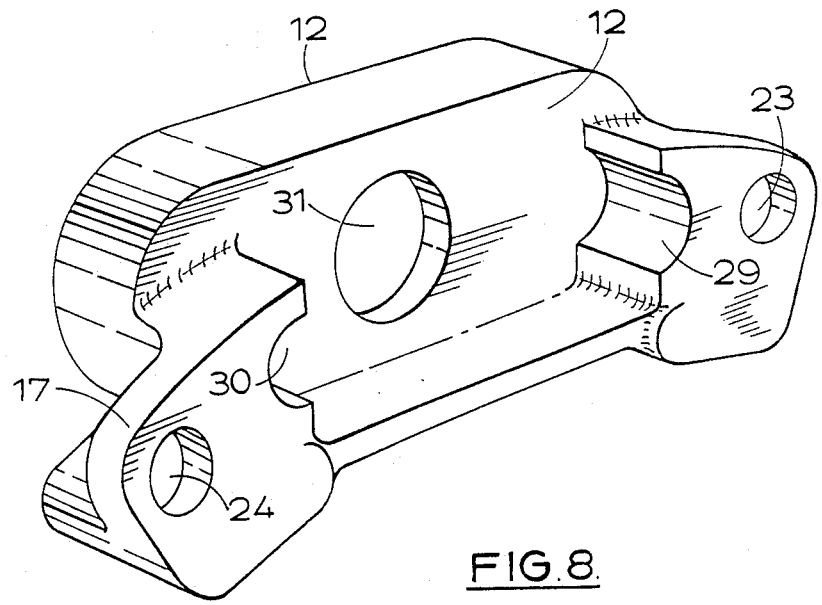
FIG. 8 is a perspective view of the bracket viewed from inboard of the disc.
Figure 9:
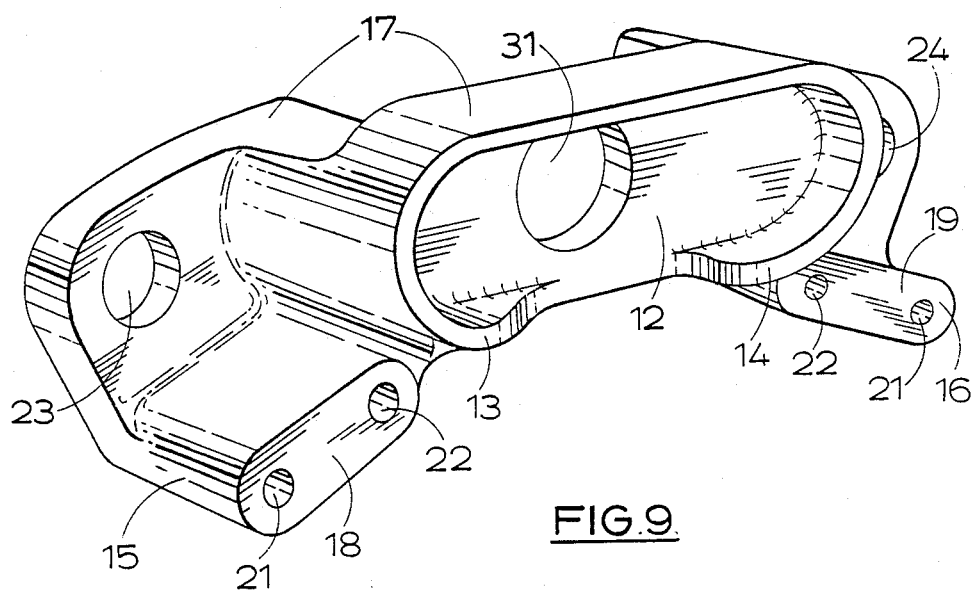
FIG. 9 is a perspective view of the side of the bracket adjacent to the disc face.

The disc brake assembly illustrated in the drawings comprises a caliper 1 which straddles the peripheral edge of a disc 2 rotatable with a wheel 3 of which the profile is shown in chain-dotted outline. The caliper 1 is mounted on the stationary casing 4 of an axle of which an axle shaft journalled for rotation in the casing 4 carries at its outer end an axle flange 5 on which the wheel 3 is mounted. The disc 2 may be detachably carried from the wheel 3, or from the flange 5, or clamped between the two components. In the example shown in FIG. 4 the disc 2 is kinked at portion 2' to enable it to be secured at portion 5' to the wheel-mounting flange 5.

The caliper 1 is mounted on the casing 4 by means of a second bracket 6 and a first bracket 7.

The second bracket 6 is bolted against a mounting face 8 on the casing 4 by six bolts 9 which are circumferentially spaced in two rows of three. The bracket 6 extends axially from the disc 2 to a position inboard of the rear end of the caliper 1 where it is provided with a radial flange 10, and bosses 11 of frusto-conical outline are provided in the circumferentially outermost ends of the flange 10.

The first bracket 7 comprises a radially projecting central diaphragm 12 provided on its inboard side with relatively thin axially extending flanges 13, 14 which extend circumferentially. Circumferentially spaced feet 15, 16 project axially inboard from the radially innermost end of a radial flange 17 which incorporates the diaphragm 12, and the free ends of the feet 15, 16 are provided with mounting faces 18, 19 adapted to be clamped into engagement with complementary faces on the outboard end of the second bracket 6 by bolts 20 passed through openings in the bracket 6 and screwed into tapped holes 21, 22 in the feet 15, 16.

Openings 23, 24 are provided in the flange 17 at circumferentially spaced positions in axial alignment with the bosses 11 in the bracket 6.

When the bracket 7 is bolted to the bracket 6, the diaphragm extends radially between an hydraulic actuator 25 and a directly actuated friction pad assembly 26. The actuator 25 is incorporated in the caliper 1, with which it constitutes an assembly, and the flanges 13, 14 encircle the actuator 25. The directly actuated friction pad assembly 26 comprising a pad 27 of friction material carried by a rigid backing plate 28. In this position the inner faces of the feet 15, 16 lie outside the projection of the peripheral edge of the axle flange 5.

End edges of the backing plate 28 incorporate regions of part circular outline which are slidably received in recesses 29, 30 of complementary outline in the sides of the flange 17 on the disc side of the diaphragm 12.

The diaphragm 12 is provided with a central opening 31 through which a brake applying force is transmitted to the pad assembly 26 through a rod 32.

An indirectly actuated friction pad assembly 33 is carried by the caliper 1 on the opposite, outboard, side of the disc 2.

The caliper 1 is mounted for axially sliding movement with respect to the disc on a pair of circumferentially spaced guide pins 34 of which their axes are parallel to the axle. The guide pins 34 extend through bosses on the caliper 1 (not shown), and are supported at opposite ends in the bosses 11 in the bracket 6 and in the complementary openings 23, 24 in the bracket 7. The inboard end of each pin 34 is of frusto-conical outline complementary to the outline of the respective boss 11 in which it is received.

Alternatively, the brake may be spring applied by means of springs 35, 36, and is released by operation of the actuator 25, either for parking/emergency or for normal braking.

Such a construction forms the subject of our British Patent Application Ser. No. 8529474 and need not be described further herein.

To remove the caliper assembly for servicing or replacement, the wheel 3 is first removed from the axle flange 5. After removing the bolts 20, the disc 2 can then be removed axially with the caliper assembly, including the bracket 7 and the guide pins 34, securely clamped to it by the springs 35, 36. This assembly can pass over the peripheral edge of the flange 5. This same assembly can be located on the disc 2 in a workshop remote from the vehicle by the use of a jig and then be re-fitted to the vehicle without disturbing the lubrication or the sealing of the guide pins 34.

In a modification of the brake described above, one guide pin 34 may be replaced by an anti-articulation link which may or may not be detached for removal of the caliper in an axial direction.

Also the friction pad assemblies 26, 33 may be carried from the caliper 1 indirectly by means of a load-spread plate providing a degree of articulation.

I claim:

1. A disc brake for a vehicle comprising a disc having an inboard side and outboard side and being rotatable with an axle shaft which is rotatably mounted in an axle casing and which has a wheel-mounting flange by means of which a wheel is mounted on said axle shaft, the wheel-mounting flange having an inboard side, an outboard side, and an outer peripheral edge; a wheel mounted on said wheel-mounting flange on said axle shaft; inboard and outboard friction pad assemblies for engagement with opposite faces of said disc; a caliper assembly; an actuator incorporated in said caliper assembly for applying said friction pad assemblies to said disc; a bracket for mounting said caliper assembly on said axle casing; means detachable mounting said bracket on said axle casing on said inboard side of said disc, said bracket having a radial flange projecting radially outwards to locate said caliper assembly and having a peripheral edge, and said radial flange of said bracket incorporating a rigid diaphragm which extends between said actuator of said caliper assembly and the inboard friction pad assembly, said diaphragm being provided with at least on opening through which a brake-applying force from said caliper assembly can be transmitted to said inboard pad assembly, said radial flange of said bracket also having relatively thin axially extending flanges which are disposed between said inboard pad assembly and said axle shaft and which extend circumferentially around the periphery of one end of said actuator substantially to surround that end of said actuator so as to form a housing in which said actuator is received, and wherein said caliper assembly and said bracket lie substantially outside said outer peripheral edge of said wheel-mounting flange, and wherein said disc has a first, radially inner, part which is outboard of said wheel-mounting flange, and a second, radially outer, part which is inboard of said wheel mounting flange, no portion of said second part being within the plan projection of said outer peripheral edge of said wheel-mounting flange as viewed along said central axis of said axle shaft so that after removing the wheel from said wheel-mounting flange and detaching said bracket from said axle casing, said disc and said caliper assembly can be withdrawn from said axle shaft in a single direction parallel to said central axis.

2. A disc brake according to claim 2, wherein a rod passes through said opening to transmit said force to said inboard pad assembly.

3. A disc brake according to claim 1, wherein said bracket is also provided with strong fixing points for securing said bracket on said axle casing and said fixing points lie radially outside the peripheral edge of said wheel-mounting flange.

4. A disc brake according to claim 3, wherein said fixing points incorporate radial mounting faces which are clamped into mating engagement with complementary faces by clamp bolts.

5. A disc brake according to claim 1, wherein said diaphragm comprises a part of said radial flange and wherein said radial flange is provided at circumferentially spaced opposite ends of said diaphragm with pad guide surfaces which project from said diaphragm towards said disc.

6. A disc brake according to claim 1, wherein said caliper assembly is of the axially movable reaction type, said inboard pad assembly is applied directly to said disc by said actuator, and said outboard pad assembly is applied indirectly to the disc by the reaction on said caliper assembly.

7. A disc brake according to claim 1, wherein aid bracket comprises a first bracket, and a second bracket is provided with which said first bracket co-operates, said second bracket being adapted to be secured to said axle casing, extends axially, and incorporates at its inboard end a radial flange for locating the inboard end of said caliper assembly.

8. A disc brake according to claim 7, wherein the caliper assembly is supported for axial movement on at least one axially extending guide pin whose axis is parallel to that of said axle shaft with the guide pin being supported at opposite ends in said flanges of said first and second brackets.

9. A disc brake according to claim 7, wherein said caliper assembly is supported for axial movement on a pair of circumferentially spaced axially extending guide pins of which the axes are parallel to that of said axle shaft with said guide pins being supported at opposite ends in said flanges of said first and second brackets.

10. A disc brake according to claim 8 wherein said guide pin is integral with said first bracket, and the inboard end remote from said disc is of frusto-conical outline and is axially received in a fixed supporting boss defined in said flange of said second bracket.

11. A disc brake according to claim 7, wherein an anti-articulation link is provided to prevent said caliper assembly from rotating about said guide pin as an axis.

12. A disc brake for a vehicle comprising a disc having an inboard side, an outboard side, and an outer peripheral edge, the disc being rotatable with an axle shaft which is rotatably mounted in an axle casing, said axle shaft having rigid with it a wheel-mounting flange providing means by which a wheel may be affixed for rotation with said axle shaft, a wheel mounted on said wheel-mounting flange on said axle shaft, inboard and outboard friction pad assemblies for engagement with opposite faces of said disc, a caliper assembly, an actuator incorporated in said caliper assembly for applying said friction pad assemblies to said disc, a first bracket for mounting said caliper assembly on a second bracket which in turn is mounted on said axle casing, means detachably mounting said first bracket on said second bracket on said inboard side of said disc, said first bracket having a radial flange projecting radially outwards to locate said caliper assembly and having a peripheral edge, said first bracket incorporating a rigid diaphragm which extends between said actuator of said caliper assembly and the inboard friction pad assembly, said diaphragm being provided with at least one opening through which a brake-applying force from said caliper assembly can be transmitted to said inboard pad assembly, wherein said wheel-mounting flange has a peripheral edge and said caliper assembly and said first bracket lie substantially outside said peripheral edge of said wheel- mounting flange, and wherein said disc does not project to a position adjacent and inboard of said wheel-mounting flange so that after removing the wheel from said wheel-mounting flange and detaching said first bracket from said second bracket, said disc, said first bracket, and said caliper assembly can be withdrawn from said axle shaft in a single straight-line direction perpendicular to the plane of said disc.

13. A disc brake according to claim 12, wherein said second bracket is provided at an inboard end with a radial flange for locating the inboard end of said caliper assembly.

14. A disc brake according to claim 13, wherein the caliper assembly is supported for axial movement on at least one axially extending guide pin whose axis is parallel to that of said axle shaft with the guide pin being supported at opposite ends in said radial flanges of said first and second brackets.

15. A disc brake according to claim 14, wherein said guide pin is integral with said first bracket, and the inboard end remote from said disc is of frusto-conical outline and is axially received in a supporting boss defined in said radial flange of said second bracket.

16. A disc brake for a vehicle comprising a disc having an inboard side, an outboard side, and an outer peripheral edge, the disc being rotatable with an axle shaft which is rotatably mounted in an axle casing, said axle shaft defining a radially extending wheel-mounting flange having an inboard face and an outboard face, a wheel, threaded fastening means affixing said wheel directly to said wheel mounting flange adjacent said outboard face of said wheel-mounting flange for rotation with said axle shaft about a central axis of said axle shaft, inboard and outboard friction pad assemblies for engagement with opposite faces of said disc, a caliper assembly, an actuator incorporated in said caliper assembly for applying said friction pad assemblies to said disc, a bracket for non-rotatably mounting said caliper assembly on said axle casing, means detachably mounting said bracket on said axle casing on said inboard side of said disc, said bracket having a radial flange projecting radially outwards to locate said caliper assembly and having a peripheral edge and said bracket incorporating a rigid diaphragm which extends between said actuator of said caliper assembly and the inboard friction pad assembly, said diaphragm being provided with at least one opening through which a brake-applying force from said caliper assembly can be transmitted to said inboard pad assembly, wherein said wheel-mounting flange has an outer peripheral edge and aid caliper assembly and said bracket lie substantially outside said outer peripheral edge of said wheel-mounting flange, and wherein no part of said disc projects to a position inboard of said wheel mounting flange and radially inside the plan projection of said outer peripheral edge of said wheel-mounting flange viewed in the direction of said central axis, so that after removing the wheel from said wheel-mounting flange and detaching said bracket from said axle casing, said disc and said caliper assembly can be removed from said axle shaft by withdrawing said disc and caliper assembly in a single straight-line direction perpendicular to the plane of said disc and parallel with the direction of said central axis, with said disc clearing said outer peripheral edge of said wheel-mounting flange so that removal of said wheel-mounting flange is not necessary in order to remove said disc and caliper assembly from said brake.

17. A disc brake according to claim 16, wherein said diaphragm is provided with relatively thin axially extending flanges which are disposed between said inboard pad assembly and said axle shaft, and extend circumferentially around the periphery of said actuator to form a housing in which the actuator is received.

* * * * *